No. 869,345. PATENTED OCT. 29, 1907.
A. BUSH.
DRAFT EQUALIZER.
APPLICATION FILED JAN. 22, 1907.
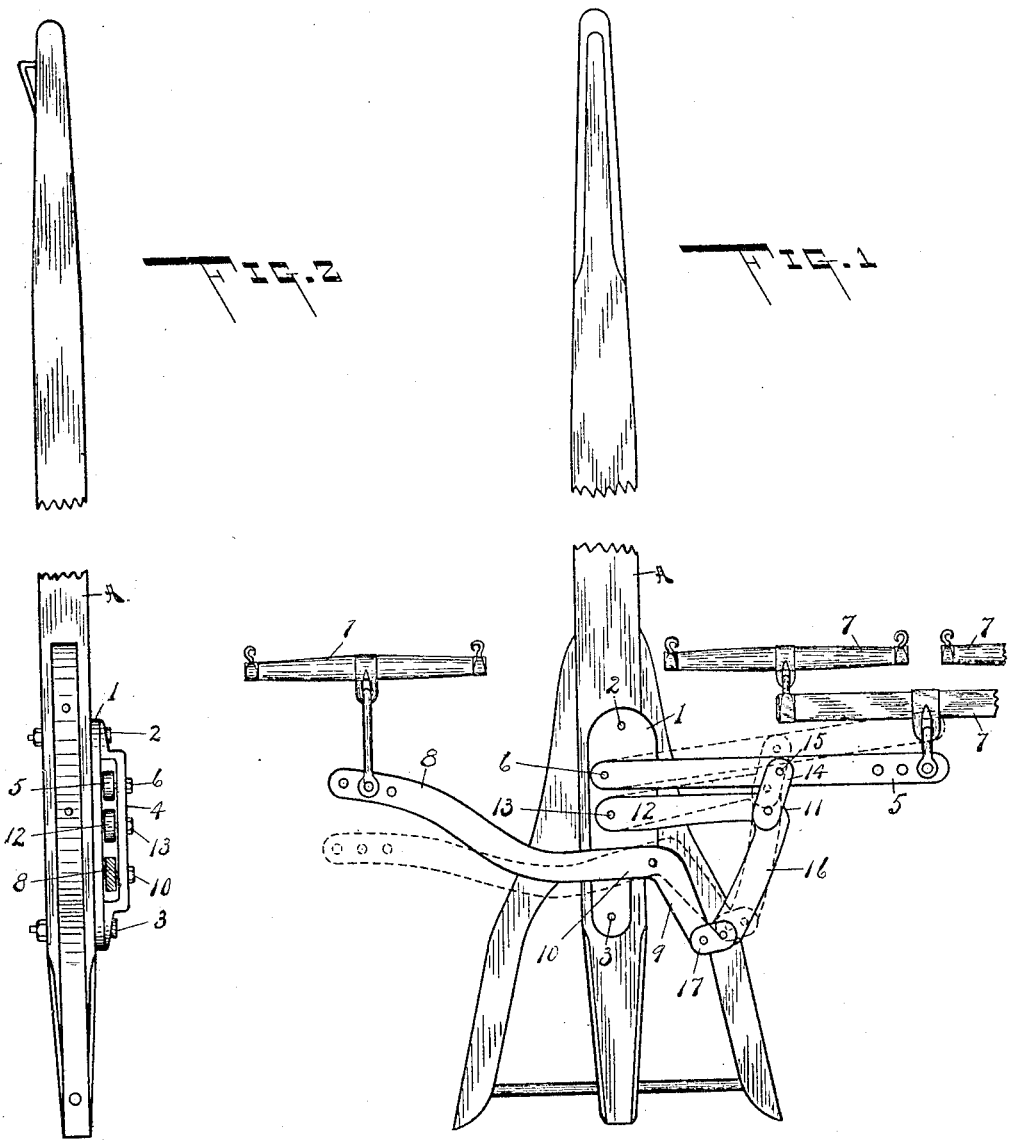
WITNESSES:
L. H. Marshall
C. P. Walls
INVENTOR
Alexander Bush.
BY
Geo. B. Willcox ATTORNEY

UNITED STATES PATENT OFFICE.

ALEXANDER BUSH, OF PINCONNING, MICHIGAN, ASSIGNOR OF ONE-HALF TO JOSEPH HENNARD, OF PINCONNING, MICHIGAN.

DRAFT-EQUALIZER.

No. 869,345.     Specification of Letters Patent.     Patented Oct. 29, 1907.

Application filed January 22, 1907. Serial No. 353,467.

*To all whom it may concern:*

Be it known that I, ALEXANDER BUSH, a citizen of the United States, residing at Pinconning, in the county of Bay and State of Michigan, have invented certain new and useful Improvements in Draft-Equalizers; and I do hereby declare the following to be a full, clear, and exact description of the invention, such as will enable others skilled in the art to which it appertains to make and use the same.
My invention relates to equalizers whereby a team of two or more horses may be hitched up on one side of the tongue of a vehicle and a less number of horses hitched up on the opposite side of the tongue, the unequal pull on opposite sides of the tongue being balanced by means of the equalizing mechanism.

In the present embodiment of my invention I have shown a three-horse equalizer, one object of which is to distribute the uneven pull in such a manner that the team of horses on one side cannot pull the single horse on the opposite side around.

Another object attained by my invention is that the whiffletrees of the team on one side and of the single horse on the other side are normally in alinement.

A further object is the provision of a mechanism which will permit the single horse, if he gets back of the team, to pull up even with the team without having to pull against the tongue, thus avoiding the objectionable side draft so common among other devices of this nature.

A still further object is the provision of means whereby the center horse is not brought too close to the tongue, which tends to thrash about on rough roads and flogs the center horse of the team if the latter is held too close to the tongue.

Another object of my invention is the provision of an equalizing mechanism which will permit the horses to pull in a straight line therefrom or at right angles thereto rather than causing the horses to be hitched up at an angle to the tongue and equalizer, such a position bringing all the strain on the near shoulders of the team and the off shoulder of the single horse.

Another object attained by my invention is that the single horse can be hitched closer to the load and nearer the tongue, causing an advantage in pull and an economy in space. Each horse is made to pull an equal share, but if the horses on one side or the other of the pole or tongue get behind, they do not have to pull more than their share of the weight to get even again. The device can be applied to any wagon or vehicle having a pole or tongue.
My invention further consists in certain novel features and combinations of parts such as will be more fully described hereinafter and particularly pointed out in the claims.

In the accompanying drawings wherein is illustrated one embodiment of which my invention is capable, Figure 1 is a top plan view of this form of my invention, the keeper being removed to better disclose the construction, and Fig. 2 is a side view thereof.

In the drawings A indicates the pole or tongue of a vehicle, to which tongue my invention is applied. A main wear or bed plate 1 is secured longitudinally of the tongue, the usual draw bolt 2 passing through the front end of the plate, the rear end of the plate being bolted to the tongue as at 3. A keeper or cover plate 4 approximately U-shaped in longitudinal cross section, is placed over the bed plate and secured by the bolts 2 and 3, the equalizing mechanism being secured to the tongue between the plates. A preferably straight bar or level 5 projects laterally from the tongue toward the right, (in the drawing) the inner end of the bar being pivotally secured between the guard and wear plates as at 6 at a point near and just behind the draw bolt 2, the free or outer end of the bar adapted to have an evener 7 secured thereto to which a team of horses is hitched. The outer end of the bar may be apertured to properly adjust the team relative to their size and to the tongue. Projecting laterally toward the left (in the drawing) is the long curved arm 8 of a bell crank lever which is pivoted at its angle between the plates 1 and 4 at a point 10 near the rear ends of the plates and preferably overlapping the lever bar 5. The long arm is bent or curved so that its outer end will be in alinement with the lever bar 5 in order that the team on one side and the horse on the other side of the tongue may be brought as close as possible to the load and the use of long tugs or connections avoided. The remaining arm 9 of the bell crank which constitutes an extension thereof lies at approximate right angles to the long arm and extends rearwardly on the same side of the tongue as is the lever bar 5.

As a means for connecting the lever bar 5 and the bell-crank 8, 9 so that the pull of the single horse on the long arm 8 will be equalized by the pull of the team on the shorter lever 5 and vice versa, I have provided a second bell crank or angle bar 11, the angle of which projects toward the right (in the drawings) the free end of one arm 12 of the intermediate bell crank is pivotally secured between the plates at 13 just behind the pivotal point 6 of the bar 5 and a link connection 14 extends between the angle of the bell crank 11 and a point 15 approximately equidistant from the ends of lever bar 5, the arm 12 of the intermediate bell crank lying substantially parallel with bar 5. The remaining arm 16 of the intermediate bell crank extends rearwardly to a point beside the free end of the shorter arm 9 of the main bell crank, the free end of arm 16 being joined to the free end of arm 9 by a link connection 17. It will be seen that no matter which side gets behind, the outer ends of the curved arm 8 and lever bar 5 are in alinement and in pulling straight again, that is to say at right angles to the pole, the strain is not transmitted through the tongue, but through the intermediate bell crank 11, which also holds the parts in position and keeps the links true.

It is evident that many changes might be made in the form and arrangement of the several parts described without departing from the spirit and scope of my invention and hence I do not wish to limit myself to the exact construction herein set forth.

Having thus fully disclosed my invention what I claim as new is:—

1. The combination with the pole of a vehicle, of a draft equalizer comprising a straight draft bar, the inner end of the bar being pivoted to the pole, a long curved draft lever pivoted to the pole, an arm projecting rearwardly from the long curved draft lever on that side of the pole with the straight draft bar, a rigid bell crank, one arm of which is pivoted to the pole, a link pivotally connecting the remaining arm of the bell crank with the rearwardly extending arm of the curved draft lever, and a pivotal connection between the bell crank and the straight draft bar.

2. The combination with a pole or tongue, of an equalizer comprising a straight draft bar pivoted at one end to the tongue, a curved draft lever pivoted at its angle to the tongue, the pivotal point of the draft lever lying in a plane intersecting the draft bar so that the inner end of the draft bar overlaps or passes beyond the inner pivoted end of the curved draft lever, a rigid bell crank, one arm of which is pivoted to the pole, a link connecting the remaining arm of the bell crank to the inner end of the curved draft bar and a pivotal connection between the bell crank and the straight draft bar, the bell crank located between the straight draft bar and the inner end of the curved draft lever, one arm of the bell crank lying approximately parallel with the draft bar.

3. The combination with the pole of a vehicle, of a draft equalizer comprising a straight draft bar projecting from one side of the pole, the inner end of the bar being pivoted to the pole, a draft lever pivoted intermediate its ends to the pole, the longer arm of the lever being curved and projecting from the opposite side of the pole, the shorter arm of the lever extending rearwardly and lying on the same side of the pole with the draft bar, an intermediate bell crank, one arm of which lies approximately parallel with the straight draft bar, the free end of said bell crank arm being pivotally secured to the pole, the remaining arm of the bell crank projecting rearwardly to a point adjacent the free end of the shorter arm of the draft lever, a link connection between the free ends of the shorter draft lever arm and the last mentioned bell crank arm, and a link connection between the angle of the bell crank and a point approximately equidistant the ends of the draft bar.

4. The combination with the pole of a vehicle, of a straight draft bar projecting from one side of the pole, the inner end of the bar pivotally secured to the pole, a bell crank draft lever pivoted at its angle to the pole, the longer arm of the bell crank draft lever projecting from the opposite side of the pole, the shorter end of the bell crank projecting on the same side of the pole with the bar, a rigid bell crank, one arm of which is pivoted to the pole and link connections between the shorter end of the bell crank draft lever and the free arm of the bell crank and between the angle of the bell crank and the draft bar.

5. The combination with a pole or tongue, of an equalizer comprising a draft bar pivoted at one end to the pole, a curved draft lever pivotally secured at its angle to the tongue, the inner end of the draft bar extending rearwardly nearly parallel with the pole, a rigid bell crank lever, one arm of which lies parallel with the draft bar and is pivoted to the pole to have a motion parallel to that of the draft bar, the remaining arm of the bell crank extending rearwardly to a point opposite the rear end of the draft lever, a link lying nearly perpendicularly to the pole and connecting the rear ends of the draft lever and of the bell crank respectively, and a link connection between the bell crank and the draft bar.

6. The combination with the pole of a vehicle, of a bed plate secured thereto, a guard plate superposed thereon, a straight draft bar extending laterally from the pole on one side, the inner end of the bar being pivotally secured between the plates, a curved draft lever extending between and pivotally secured to the plates in rear of the bar, the longer curved arm of the draft lever projecting from the opposite side of the pole, the shorter arm of the draft lever projecting past the plates and lying on the same side of the pole with the draft bar, a bell crank, one arm of which is pivotally secured between the plates at a point intermediate the pivotal points of the draft bar and draft lever, a link pivotally connecting the remaining arm of the bell crank to the shorter arm of the draft lever, and a pivotal connection between the bell crank and the straight draft bar.

In testimony whereof, I affix my signature in presence of two witnesses.

ALEXANDER BUSH.

Witnesses:
GILBERT W. HAND,
DUDLEY J. KAVANAGH.